United States Patent
Saito et al.

(10) Patent No.: US 7,493,043 B2
(45) Date of Patent: Feb. 17, 2009

(54) ONU MANAGEMENT METHOD AND OPTICAL LINE TERMINATION

(75) Inventors: Toshiyuki Saito, Yokohama (JP);
Takahiro Yoshida, Tokyo (JP);
Yasunari Shinohara, Fujisawa (JP);
Junya Shimofusa, Fujisawa (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 272 days.

(21) Appl. No.: 11/366,838

(22) Filed: Mar. 3, 2006

(65) Prior Publication Data

US 2007/0110441 A1    May 17, 2007

(30) Foreign Application Priority Data

Nov. 11, 2005    (JP)    ............... 2005-326955

(51) Int. Cl.
*H04J 14/00* (2006.01)
(52) U.S. Cl. ........................................... 398/71
(58) Field of Classification Search ............. 398/68–73, 398/58–67, 162; 370/465
See application file for complete search history.

(56) References Cited

U.S. PATENT DOCUMENTS

2005/0008372 A1*  1/2005  Hochbaum ............ 398/140
2005/0019035 A1   1/2005  Egashira

FOREIGN PATENT DOCUMENTS

| JP | 2002016985  | 1/2002 |
| JP | 2002077197  | 3/2002 |
| JP | 2003-244179 | 8/2003 |
| JP | 2003244179  | 8/2003 |
| JP | 2005-045566 | 2/2005 |
| JP | 2005045566  | 2/2005 |
| JP | 2006166083  | 6/2006 |

OTHER PUBLICATIONS

"Broadband optical access systems based on Passive Optical Networks (PON)" G.983.1 Series G: Transmission Systems and Media Digital Systems and Networks Digital sections and digital line system—Optical line systems for local and access networks.

* cited by examiner

*Primary Examiner*—Quan-Zhen Wang
(74) *Attorney, Agent, or Firm*—McDermott Will & Emery LLP

(57) ABSTRACT

In a PON system, a PON-ID assigned to a connected ONU before replacement is assigned to a newly connected ONU after the replacement and, setting data before the replacement is succeeded also after the replacement. An OLT includes a PON-ID state where a management state of the PON-ID is stored, a PON-ID management table where the PON-ID and an ONU serial number of the connected ONU and setting data are correspondingly stored and, a delete ONU table where the PON-ID and an ONU serial number of a replacement object are correspondingly stored. When the OLT receives an ONU replacement instruction from an operation system, the PON-ID assigned to the ONU of the replacement object is assigned to an ONU newly connected during the ONU replacement.

5 Claims, 14 Drawing Sheets

| PON-ID MANAGEMENT TABLE | | | | | |
|---|---|---|---|---|---|
| | PON-ID ASSIGNMENT FLAG (STORAGE AREA) | CONNECTION ONU SERIAL NUMBER (STORAGE AREA) | INDIVIDUAL SETTING (STORAGE AREA) | | |
| | | | NETWORK ADDRESS | MAXIMUM BAND-WIDTH | USER NAME |
| PON-ID #0 | 1 | 0x AAAA AAAA AAAA AAAA | IP1 | 100Mbit/s | XXX |
| PON-ID #1 | 1 | 0x BBBB BBBB BBBB BBBB | IP2 | 10Mbit/s | YYY |
| PON-ID #2 | 1 | 0x CCCC CCCC CCCC CCCC | IP3 | 100Mbit/s | ZZZ |
| PON-ID #3 | 0 | null | | | |
| PON-ID #4 | 1 | 0x EEEE EEEE EEEE EEEE | | | |
| ... | ... | ... | | | |
| PON-ID #63 | 0 | null | | | |

FIG. 3

| ITEM NUMBER | PON-ID STATE | EXAMPLE OF CODED VALUE | | EXPLANATION OF STATE |
| --- | --- | --- | --- | --- |
| | | HEXADECIMAL NUMBER NOTATION | DECIMAL NUMBER NOTATION | |
| 1 | ONU IS BEING REPLACED | 0x00~0x3F | 0~63 | ONU CORRESPONDING TO PON-ID OF SPECIFIED VALUE IS BEING REPLACED |
| 2 | THERE IS PON-ID TO BE ASSIGNED | 0x40~0xFE | 64~254 | THERE IS NON-ASSIGNED PON-ID |
| 3 | THERE IS NO PON-ID TO BE ASSIGNED | 0xFF | 255 | ALL PON-IDs HAVE BEEN ASSIGNED |

ONU MANAGEMENT METHOD AND OPTICAL LINE TERMINATION

BACKGROUND OF THE INVENTION

1. Field of the Invention

The present invention relates to an Optical Network Unit (ONU) management method and an optical line termination, and particularly to an ONU management method and an optical line termination in a Passive Optical Network (PON) system including an Optical Line Termination (OLT) and an ONU or an Optical Network Termination (ONT).

2. Description of the Related Art

At present, as a realization method of an access network with high speed broad band, the introduction of a PON system has been advanced. The PON system is a network system in which plural user side units (ONU: Optical Network Unit) and one station side unit (OLT: Optical Line Termination) are connected in star configuration by an optical splitter and optical fibers, and communication is performed between the units of the OLT-ONU.

As the PON system, an ATM-PON system in which communication is performed in a PON section based on an Asynchronous Transfer Mode (ATM) communication system is standardized by the ITU-T Recommendation G.983 series (see, for example, the ITU-T Recommendation G.983.1). Besides, a Gigabit-capable Passive Optical Networks (GPON) system is standardized by the ITU-T Recommendation G.984 series.

For example, in the ATM-PON system, as described in the ITU-T Recommendation G.983.1, in order to establish communication between OLT-ONU and to perform ONU connection, a series of processings called the ranging flow is performed. The ranging flow processing is such a function that distances between OLT-ONU are measured, transmission timings of up signals from the ONUs to the OLT are determined for the respective ONUs, and collision of the up signals is prevented. When the distances are measured in the ranging flow processing, in order to prevent the collision of ONU responses at the time of the measurement, it is necessary to cause the ONUs to respond one by one. For that purpose, a unique serial number of the ONU is used. That is, the ONU serial number is designated to specify the ONU which may respond. In the OLT, a number (identifier) for ONU identification, called a PON-ID, is assigned to an ONU whose ONU serial number has been found and whose distance has been also measured, and after that, the ONU is specified by the PON-ID, and a message is exchanged between the OLT-ONU.

Although the ONU identifier is described as "PON-ID" in the after-mentioned ITU-T Recommendation G.983.1, there is a case where it is described as "ONT-ID" or "ONU-ID" according to documents.

The unique serial number of the ONU is defined by information of 64 bits, and it is defined such that the 32 upper bits indicate a vender ID (fixed value for each vender) to represent a vender, and the 32 lower bits indicate a vender definition part which can be arbitrarily defined by the vender. For example, in the vender definition part of 32 bits, "manufacturing date and serial number are assigned", or "all of the 32 bits are made serial number", so that the respective ONUs have different serial numbers and the ONUs can be identified.

In the ranging flow processing, the ONU connection is performed using the unique serial number of the ONU. As the ONU connection method, for example, two methods (Method A, Method B) are described in 8.4.1.1 of the ITU-T Recommendation G.983.1. The Method A is a method in which for example, the serial number of the ONU is registered from an operation system (OpS) to the OLT. The Method B is a method in which for example, the serial number of the ONU is not registered from an operation system to the OLT.

In the case of the Method B, although the ONU serial number is not registered to the OLT from the operation system, in order to establish the communication between the OLT-ONU, it is necessary for the OLT side to specify the serial number of the ONU. Thus, a procedure is required in which the OLT side searches for the ONU serial number. The search of the ONU serial number is such that various bit patterns (for example, several lower bits, etc.) are simply tried among 64-bit patterns of the ONU serial number, and the bit pattern consistent with the serial number of the connected ONU is found by the presence/absence of the response from the ONU. The ITU-T Recommendation G.983.1 III.2 describes an example of the search method of the ONU serial number.

Besides, there is known a system in which when a current system of plural ONUs constituting a redundant configuration and a spare system are switched over, a switch at the ONT side is set, so that the same ONU identifier is used after and before the switching (see, for example, JP-A-2005-45566). There is also known a system in which in a redundant configuration, a current system and a spare system have the same subscriber unit information (serial number) (see, for example, JP-A-2003-244179).

When the ranging flow processing is performed and the PON-ID is assigned to the connected ONU, the subsequent message between the OLT-ONU is exchanged by specifying the ONU with the PON-ID. Thus, in the case where setting is performed individually for the ONU, it is expected that the individual setting data is correlated with the PON-ID and is stored. Under such circumstances, for example, in the case where a failure occurs in an ONU, and the ONU is replaced, it is desired that the PON-ID assigned before the replacement is assigned also to an ONU after the replacement, and the individual setting data before the replacement is succeeded and set.

According to the ITU-T Recommendation G. 983.1, the procedure of the ONU replacement is not specified. In case the Method A of the ITU-T Recommendation G. 983.1, that is, the method of previously registering the ONU serial number from the OLT is adopted, since the serial number of the new ONU is known at the OLT side also at the time of the ONU replacement, the ONU serial number of the storage data has only to be rewritten. However, in order to actually perform this method, it is necessary to perform such complicated management that at the time of the ONU replacement, an ONU installation worker and an operation system administrator communicate with each other in real time, and the new ONU serial number is inputted from the operation system to the OLT, or the ONU serial number is previously informed to the operation system administrator, and the ONU with the serial number is certainly distributed to the user as the replacement destination.

In case the Method B of the ITU-T Recommendation G.983.1, that is, the method in which the ONU serial number is not registered from the OLT is adopted, the OLT searches for the ONU serial number by some method and automatically performs the ONU connection. At this time, when the ONU is simply replaced and the new ONU is connected, the PON-ID is newly assigned, and the storage data before the replacement can not be succeeded. Alternatively, it becomes necessary to manually set data again.

Besides, in the method disclosed in JP-A-2005-45566, the setting of the switch and the like are required at the ONU side.

In the method disclosed in JP-A-2003-244179, it is necessary that the current system and the spare system have the same serial number.

In view of the above circumstances, the present invention has an object to provide an ONU management method and an optical line termination, in which in a PON system, ONU connection is performed without registering a serial number of an ONU from an operation system to an OLT, and the same PON-ID as that before the ONU is replaced is assigned to a new ONU after the replacement. Besides, another object of the invention is that setting data before replacement is succeeded also after the replacement.

Another object of the invention is to eliminate the necessity that in a PON system, at the time of ONU installation or replacement, an ONU installation worker and an operation system administrator communicate with each other in real time, and an ONU serial number is inputted from an operation system to an OLT. Besides, another object of the invention is to eliminate the necessity that ONU setting data is set again after ONU replacement, and to enable the ONU replacement to be facilitated.

SUMMARY OF THE INVENTION

In order to achieve the above objects, in a PON system and an ONU management method of the invention, an OLT includes an area (PON-ID state) where a management state of a PON-ID is stored, an area (PON-ID management table) where the PON-ID and a serial number of a connected ONU are made to correspond to each other and are stored, and an area (delete ONU table) where the PON-ID and an ONU serial number of a delete object are made to correspond to each other and are stored, and when an ONU replacement instruction is received, the PON-ID management state is set to be under ONU replacement, the PON-ID is stored, the PON-ID assigned to the ONU of the replacement object is assigned to an ONU newly connected during the ONU replacement, and the PON-ID before the replacement is assigned to the ONU after the replacement.

BRIEF DESCRIPTION OF THE DRAWINGS

FIG. 3 shows an example of a structure of a PON-ID management table.

FIG. 5 shows an example of a definition of a PON-ID state.

DETAILED DESCRIPTION OF THE PREFERRED EMBODIMENTS

Hereinafter, embodiments of the present invention will be described with reference to the drawings.

Hard Structure

Figure 1:
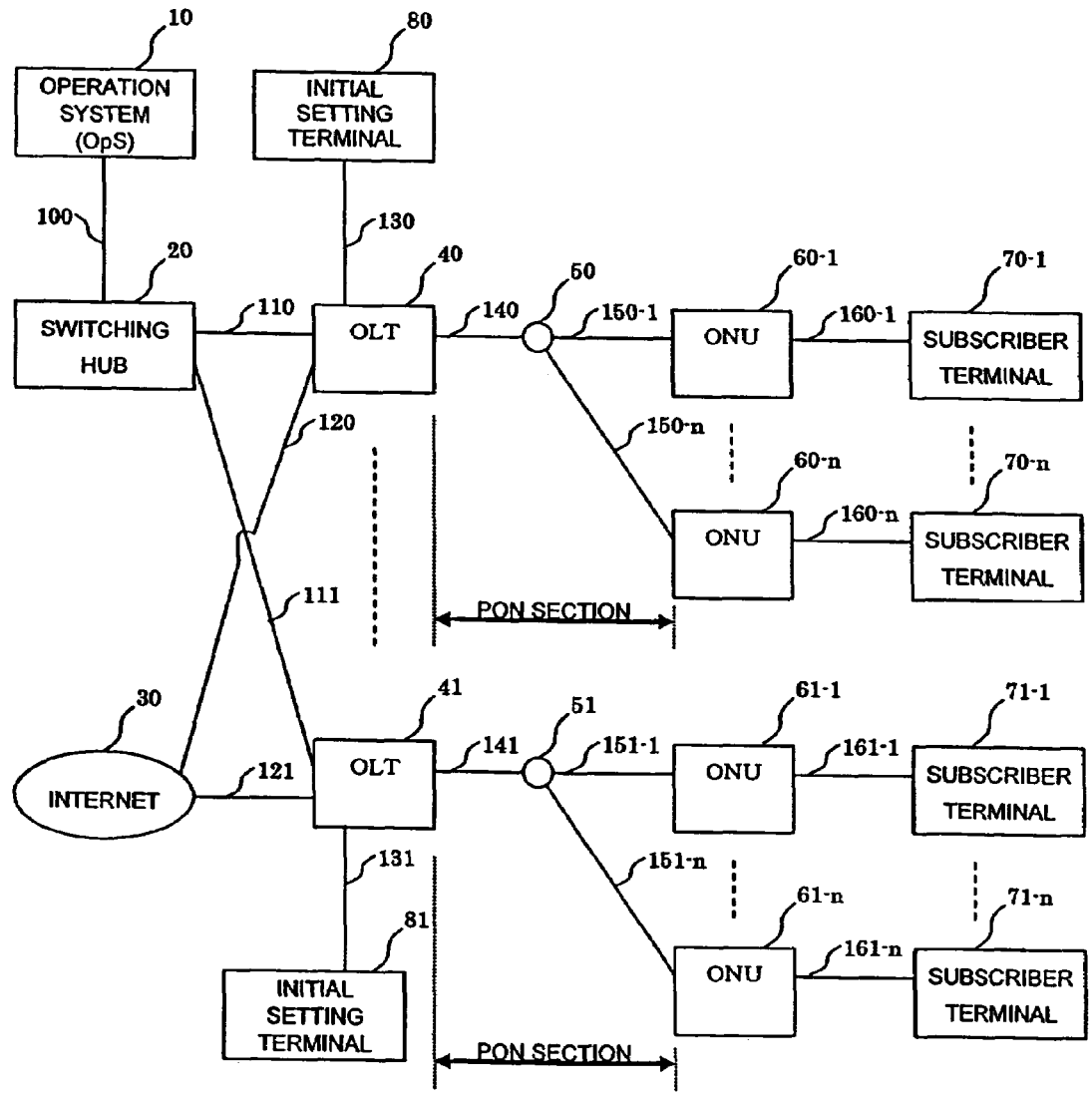
FIG. 1 shows an example of the whole system configuration of a PON system.

FIG. 1 shows an example of the whole system configuration of a PON system in an embodiment.

The PON system includes, for example, an OLT 40, plural ONUs (60-1 to 60-n), an optical splitter 50, and optical fibers 140 and 150. Besides, the PON system can include an operation system (OpS) 10, a switching hub 20, an initial setting terminal 80, and subscriber terminals 70.

In FIG. 1, the OLT 40 is connected to the plural ONUs (60-1 to 60-n) through the optical fibers (140, 150-1, 150-n) and the optical splitter 50. The optical splitter 50 equally distributes an optical signal, which has been transmitted to the optical fiber 140 from the OLT 40, to the plural connected ONUs (60-1 to 60-n). Besides, the optical splitter multiplexes optical signals transmitted from the plural ONUs (60-1 to 60-n) to the optical fibers (150-1 to 150-n) and transfers them to the OLT 40. The respective ONUs (60-1 to 60-n) are connected to the subscriber terminals (70-1 to 70-n) through lines (160-1 to 160-n) of Ethernet (registered trademark) or the like.

The ONU may be an optical network termination such as an ONT. The PON system may include plural OLTs 40 and 41. At this time, the ONUs, the optical fibers and the optical splitter are provided for each of the OLTs as shown in FIG. 1.

The operation system 10 to perform the management and setting of the PON system is connected to the OLTs (40, 41) through lines (100, 110, 111) of Ethernet (registered trademark) or the like and the switching hub 20 to perform transfer of Ethernet (registered trademark) frames.

The initial setting terminals (80, 81) can be used for performing, as the pre-stage of connection of the operation system 10, initial setting of various parameters and the like at the time of initial setting of the OLTs (40, 41), and is connected to the OLTs through, for example, lines (130, 131) of serial cables or the like.

The OLTs (40, 41) are connected to the Internet 30 through lines (120, 121) of Ethernet (registered trademark) or the like, and enable provision of services, such as Internet access, to the subscriber terminals (70-1 to 70-n, 71-1 to 71-n).

For example, in the ATM-PON system, the ONUs (60-1 to 60-n, 61-1 to 61-n) are installed, and before the services are started to the subscriber, in order to establish communication between the OLTs (40, 41)—ONUs (60-1 to 60-n, 61-1 to 61-n), ONU connection is performed in accordance with, for example, the procedure described in the ITU-T Recommendation G.983.1. In the case where the Method B of the ITU-T Recommendation G.983.1 is used for the connection of the ONU, it is necessary that the OLT searches for the ONU serial number (unique number) to specify the serial number of the ONU, and performs the connection. In this embodiment, also at the time of replacement of the ONU due to an ONU failure or the like, the serial number of the ONU after the replacement is not registered from the OLT, and the ONU connection is automatically performed.

In the following description, although the ATM-PON system will be described as an example, the invention can be similarly applied to another system such as a GPON system.

Figure 2:
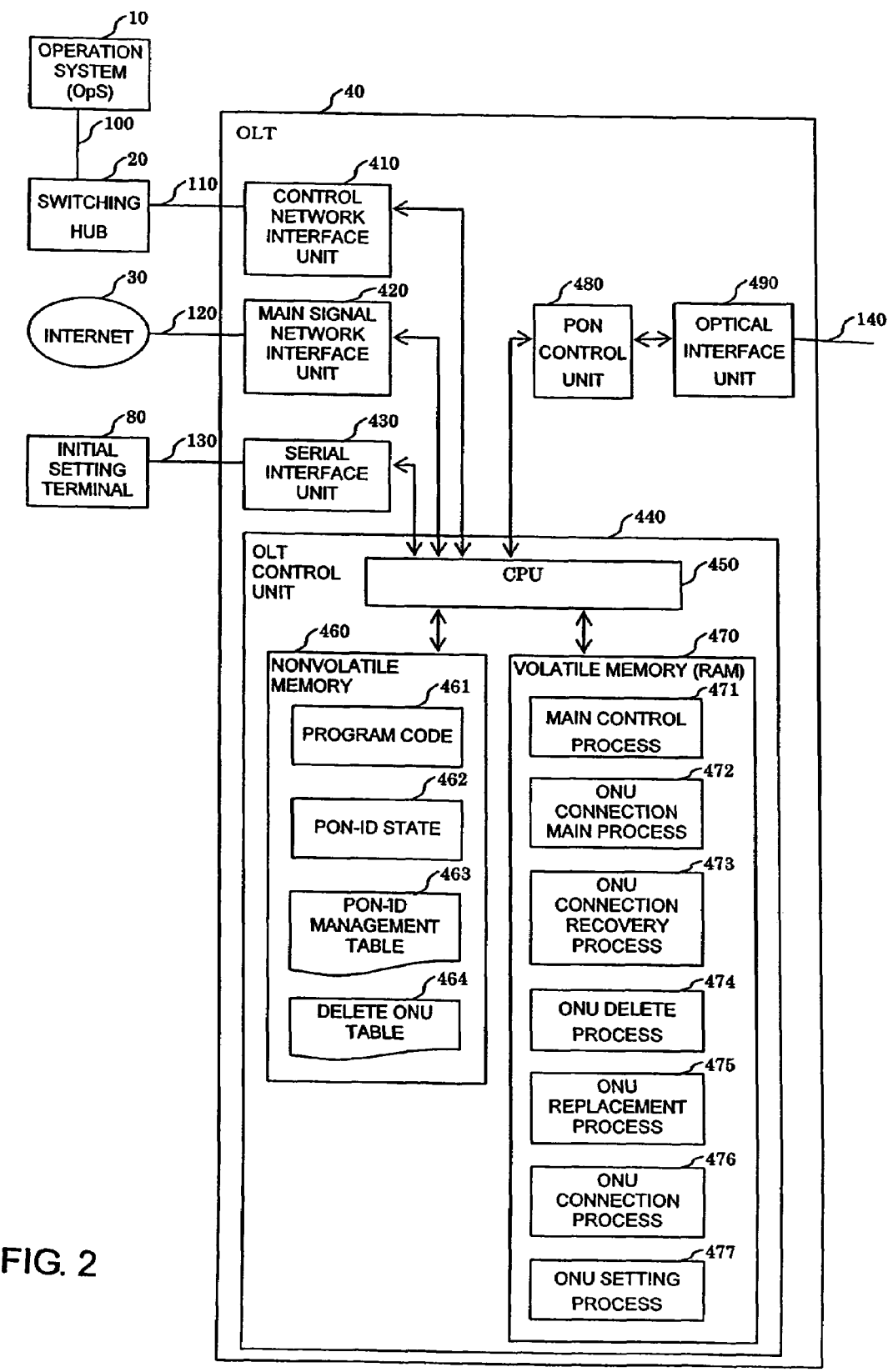
FIG. 2 is a block configuration view showing an example of an OLT.

FIG. 2 is a block configuration view showing an example of the OLT 40 in this embodiment. The OLT 40 shown in FIG. 2 includes a control network interface unit 410 connected to the operation system 10 or the switching hub 20, a main signal network interface unit 420 connected to the Internet 30, a serial interface unit 430 connected to the initial setting terminal 80, an optical interface unit 490 connected to the ONU 60 through, for example, the optical fiber 140 and the optical splitter 50 and including E/O conversion and O/E conversion, a PON control unit 480 connected to the optical interface unit 490 and to perform a PON control, and an OLT control unit 440 to perform a control of the OLT.

The OLT control unit 440 includes a CPU 450, a non-volatile memory 460, and a volatile memory (RAM) 470. As the non-volatile memory 460, although a flash memory can be used as an example, an EPROM (Erasable Programmable ROM) or an EEPROM (Electro Erasable Programmable ROM) may be used.

The non-volatile memory 460 stores, for example, a program code 461, a PON-ID state (state management unit) 462, a PON-ID management table (connection management table) 463, and a delete ONU table (delete management table) 464. The program code 461 is an OS or an application to be executed by the CPU 450, and at the time of start, it is loaded from the non-volatile memory 460 into the volatile memory 470. A main control process 471, an ONU connection main process 472, an ONU connection recovery process 473, an ONU delete process 474, an ONU replacement process 475, an ONU connection process 476, an ONU setting process 477 and the like are part of the program code 461. The main control process 471 is a main routine to perform an OLT control, and starts the ONU connection main process 472 as the need arises. The respective processes will be described later in detail.

Memory Structure

FIG. 3 shows an example of the structure of the PON-ID management table 463 in this embodiment. The PON-ID management table 463 is such a table that in this embodiment, an ONU serial number is searched, and the found ONU serial number is made to correspond to "PON-ID" and is stored.

In FIG. 3, the PON-ID management table 463 includes a flag area 4631 to indicate whether the PON-ID has been already assigned, an area 4632 to store the serial number of the ONU 60 to which the PON-ID is assigned, and an area 4633 where individual setting for the ONU is stored. The individual setting includes a setting parameter necessary for providing services to a user by using the ONU 60, and management data used for the ONU management, and any information and data may be used. As an example of the individual setting, the setting of, for example, a maximum bandwidth assigned to the ONU 60, a network address (IP address), a user name of the ONU 60 and the like are conceivable. In addition to these, suitable information concerning the communication of the ONU and/or user may be used.

In the example of FIG. 3, an area to store the PON-ID itself is not provided. This is because when the memory address and the PON-ID are made to correspond to each other, the area to store the PON-ID is not required. Here, the PON-ID is an identifier (ID) to specify the ONU 60 as a message object uniquely when a message is sent from the OLT 40 to the ONU 60, and is the ID assigned from OLT 40 at the time of the establishment of communication between the OLT-ONU and after the serial number of the ONU 60 is specified by the OLT 40. Since the example of FIG. 3 is a configuration example of a case in which 64 (0 to 63) ONUs at the maximum are connected, the areas up to PON-ID #63 are shown. An area to store the PON-ID may be provided.

With respect to the PON-ID assignment flag 4631, an example is shown in which in the case where the PON-ID has already been assigned, the value "1" is stored, and in the case of not assigned, the value "0" is stored. However, a method in which the PON-ID assignment flag 4631 is not provided can be adopted by making such a definition that in the case of not assigned, a value (for example, all are 0 or null code) previously determined in the ONU serial number storage area 4632 is stored.

Figure 4:
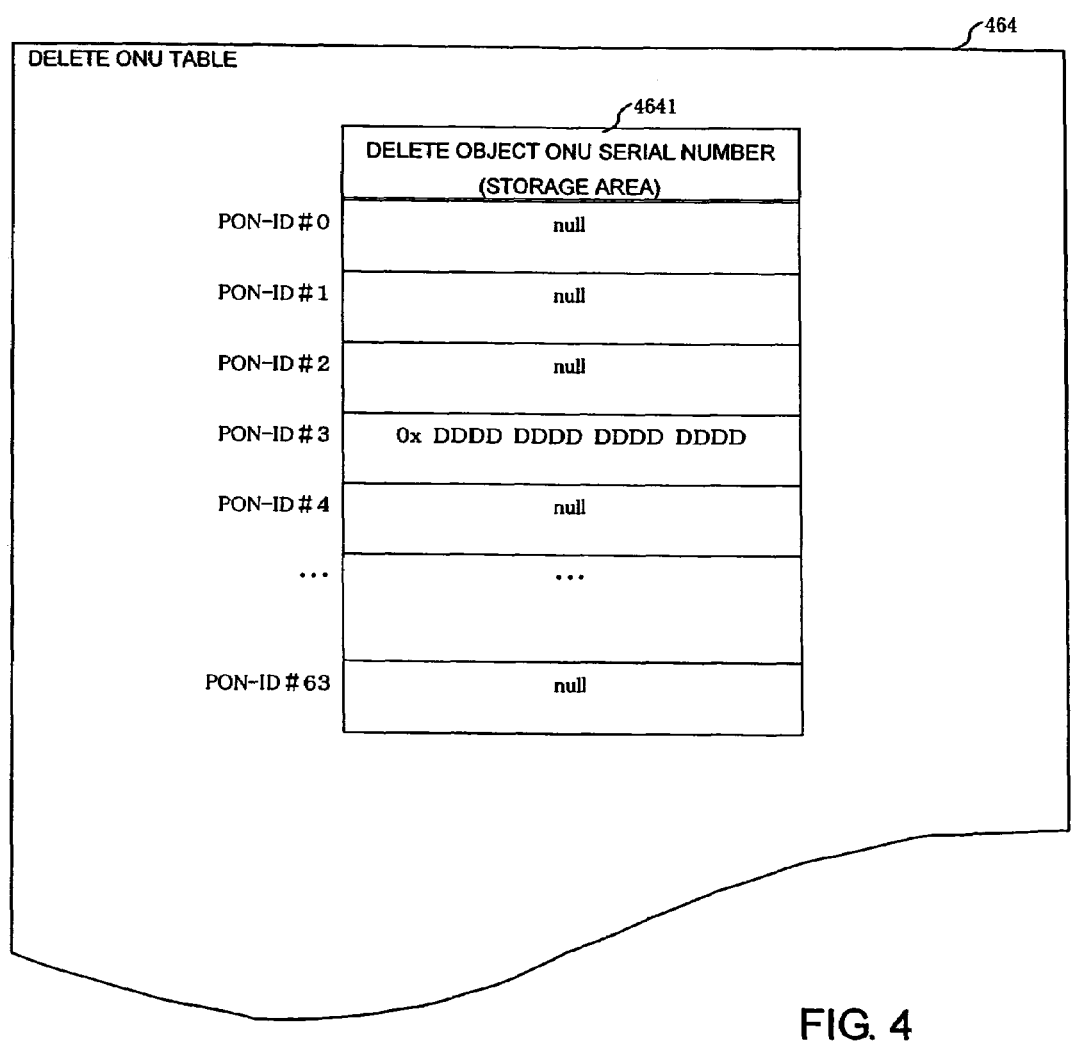
FIG. 4 shows an example of a structure of a delete ONU table.

FIG. 4 shows an example of the structure of the delete ONU table 464 in this embodiment. The delete ONU table 464 is such a table that in this embodiment, when an ONU delete instruction or an ONU replacement instruction is received from the operation system 10 or the initial setting terminal 80, the serial number of the ONU as the delete or replacement object is made to correspond to the "PON-ID" and is stored. Although the ONU delete instruction from the operation system 10 or the initial setting terminal 80 can be performed with the PON-ID, it may be performed with the ONU serial number itself. In FIG. 4, the delete ONU table 464 includes a delete object ONU serial number storage area 4641 as an area to store the ONU serial number of the delete or replacement object.

In the example of FIG. 4, an area to store the PON-ID itself is not provided. This is because when the memory address and the PON-ID are made to correspond to each other, the area to store the PON-ID is not required. Since the example of FIG. 4 is the structural example of the case in which 64 (0 to 63) ONUs at the maximum are connected, the areas up to PON-ID #63 are shown. An area to store the PON-ID may be provided.

In the delete object ONU serial number storage area 4641, for example, in the case where the instruction of "deletion of ONU of PON-ID #3" is received from the operation system 10, the ONU serial number to which the PON-ID #3 is assigned is stored into the area corresponding to PON-ID #3. A previously determined value (for example, all are 0 or null code) is stored in the area corresponding to the PON-ID which is being used (delete or replacement instruction is not received). Incidentally, for example, the operation system 10 receives the notification of ONU replacement from a subscriber or the like, and can specify the PON-ID.

For example, a time lag can occur between the time when the OLT 40 receives the replacement instruction from the operation system 10 and the time when the ONU installer actually removes the ONU as the replacement object and connects a new ONU. Since the OLT 40 periodically searches for a serial number also in this period, in the state where the serial number is deleted from the PON-ID management table 463, the ONU before the replacement is recognized as the new ONU, and the connection processing is performed. Then, the OLT 40 refers to the ONU deletion table 464, and in the case where the searched serial number is stored, it is regarded as the serial number of the ONU of the replacement object or delete object, and the connection processing or the like is not performed.

FIG. 5 is an explanatory view of an example of the definition of the PON-ID state 462 in this embodiment. In this embodiment, the PON-ID state 462 takes one of three states of "ONU is being replaced", "there is PON-ID to be assigned" and "there is no PON-ID to be assigned", and indicates the management state of the PON-ID.

The example of FIG. 5 is the example of the case in which 64 ONUs at the maximum are connected, and it is defined that the PON-ID state 462 indicating "ONU is being replaced" takes, for example, a value of 0 to 63. That is, the case of "PON-ID state 462=3" means such a situation that the replacement instruction of PON-ID #3 is received, and the replacement has not yet been ended. Besides, it is defined that in the case where the 64 ONUs are connected, and the assignment of PON-ID #0 to #63 has been completed, the state is made "there is no PON-ID to be assigned", and a value "255" is taken. Further, it is defined that in the case where less than 64 ONUs are connected, the state is made "there is PON-ID to be assigned", and a value of from "64" to "254" is taken. Incidentally, suitable values other than the above values can be defined as the values corresponding to the respective states.

Flowchart

Next, the operation of this embodiment will be described.

Figure 6:
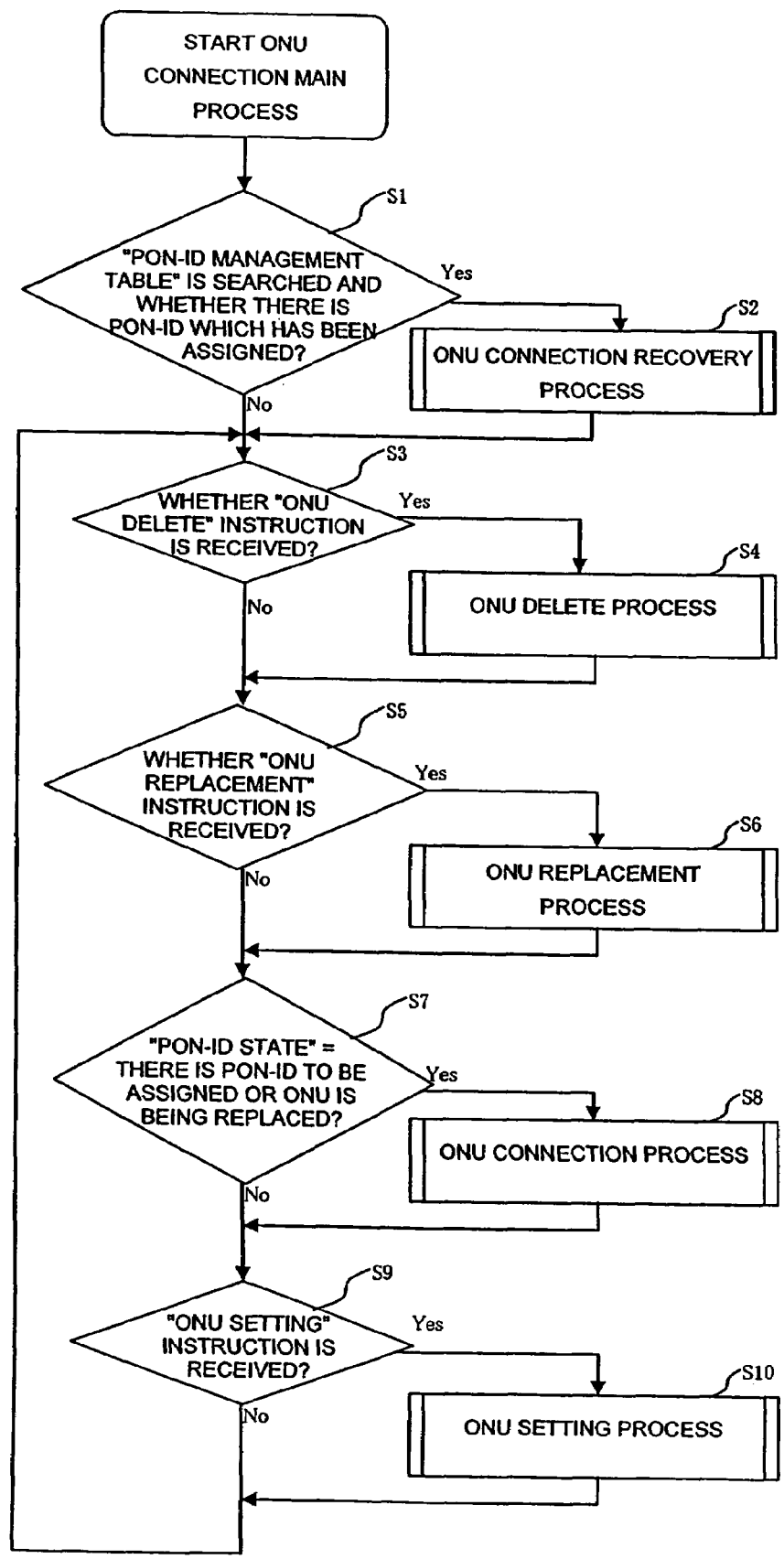
FIG. 6 shows an example of a flowchart of an ONU connection main process.

FIG. 6 shows a flowchart of an example of the ONU connection main process 472 in this embodiment. The ONU connection main process 472 is a process to perform new connection, deletion, replacement, and connection recovery of an ONU.

The ONU connection main process 472 is started from the main control process 471 at the time of OLT start. In the following description, respective processes can be executed by the CPU 450. In addition to this process, the CPU 450 receives instructions of "ONU deletion", "ONU replacement", "ONU setting" and the like at suitable timing. These instructions can be stored in, for example, a queue.

In the ONU connection main process 472, the PON-ID management table 463 is searched, and it is judged whether or not at least one PON-ID has already been assigned (S1 of FIG. 6). In the case where the assignment has already been made, the information stored in the PON-ID management table 463 is used, and the ONU connection recovery process 473 is executed to recover the ONU connection (S2 of FIG. 6).

Since the ONU connection recovery process 473 is the process in which the connection at the time of the former start is recovered at the time of OLT start, it has only to be performed once at the time of the OLT start.

Next, in the ONU connection main process 472, it is judged whether or not the "ONU deletion" instruction is received from the operation system 10 or the initial setting terminal 80 (S3 of FIG. 6). In the case where the "ONU deletion" instruction is received, the ONU delete process 474 is executed (S4 of FIG. 6).

Next, it is judged whether or not the "ONU replacement" instruction is received from the operation system 10 or the initial setting terminal 80 (S5 of FIG. 6). In the case where the "ONU replacement" instruction is received, the ONU replacement process 475 is executed (S6 of FIG. 6).

Next, the PON-ID state 462 is read, and it is judged whether or not the PON-ID state 462 indicates "there is PON-ID to be assigned" or "ONU is being replaced" (S7 of FIG. 6). In this embodiment, as shown in FIG. 5, it is judged whether the PON-ID state has a value of 64 to 254. In the case where the PON-ID state 462 indicates "there is PON-ID to be assigned" or "ONU is being replaced", the ONU connection process 476 is executed (S8 of FIG. 6). In the case where the PON-ID state 462 indicates "there is no PON-ID to be assigned", it means that the ONUs up to the maximum number are connected.

Next, it is judged whether or not the "ONU setting" instruction is received from the operation system 10 or the initial setting terminal 80 (S9 of FIG. 6). In the case where the "ONU setting" instruction is received, the ONU setting process 477 is executed (S10 of FIG. 6).

Next, in the ONU connection main process 472, return is made to the judgment (S3 of FIG. 6) as to whether or not the "ONU deletion" instruction is received, and the subsequent processing is repeated. By repeating this processing, the ONU connection main process can deal with the additional connection, replacement, deletion, and setting of an ONU which is being used.

Incidentally, the order of the processing of S3, S5, S7 and S9 of FIG. 6 may be changed.

Figure 7:
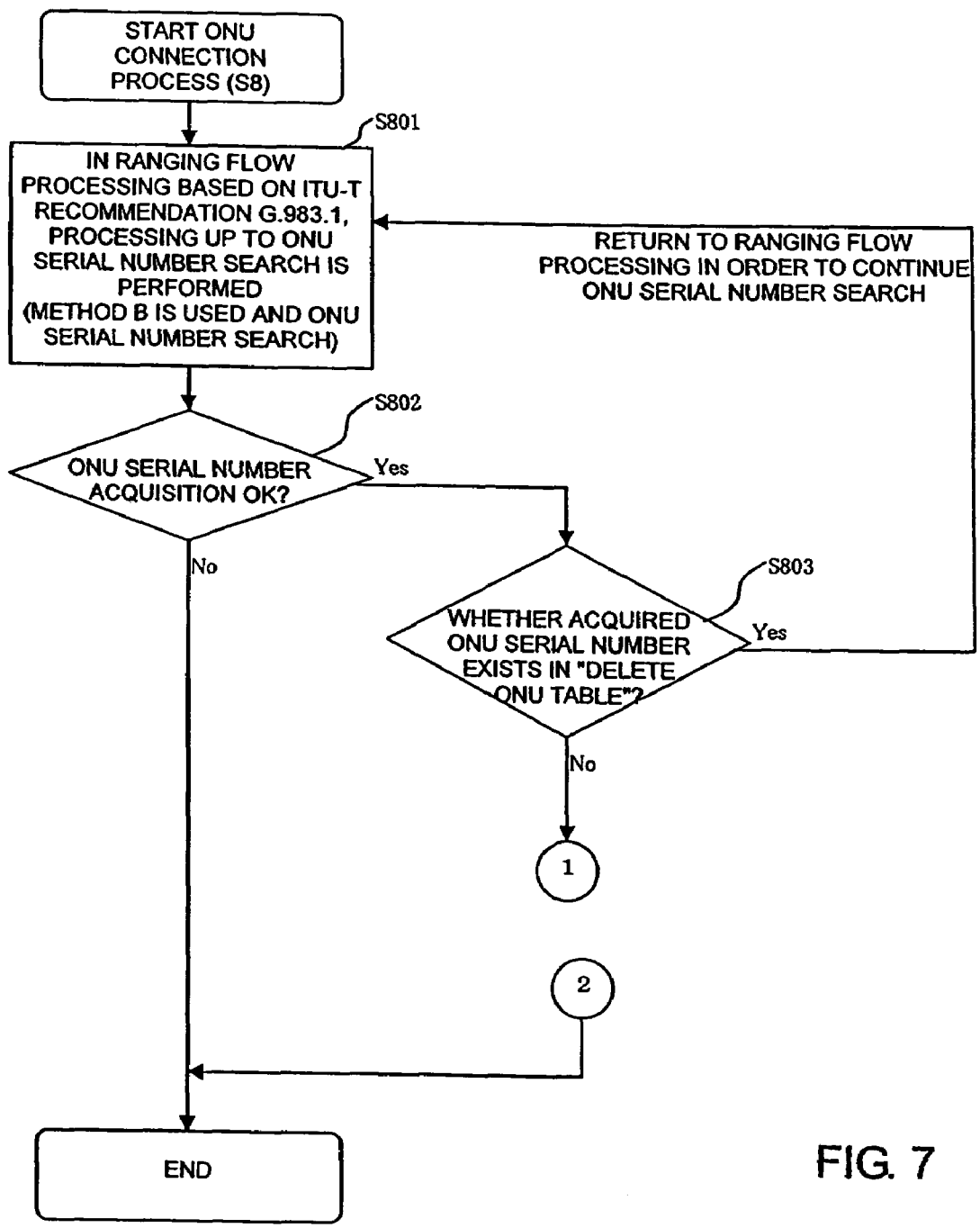
FIG. 7 shows an example of a flowchart of an ONU connection process.
Figure 8:
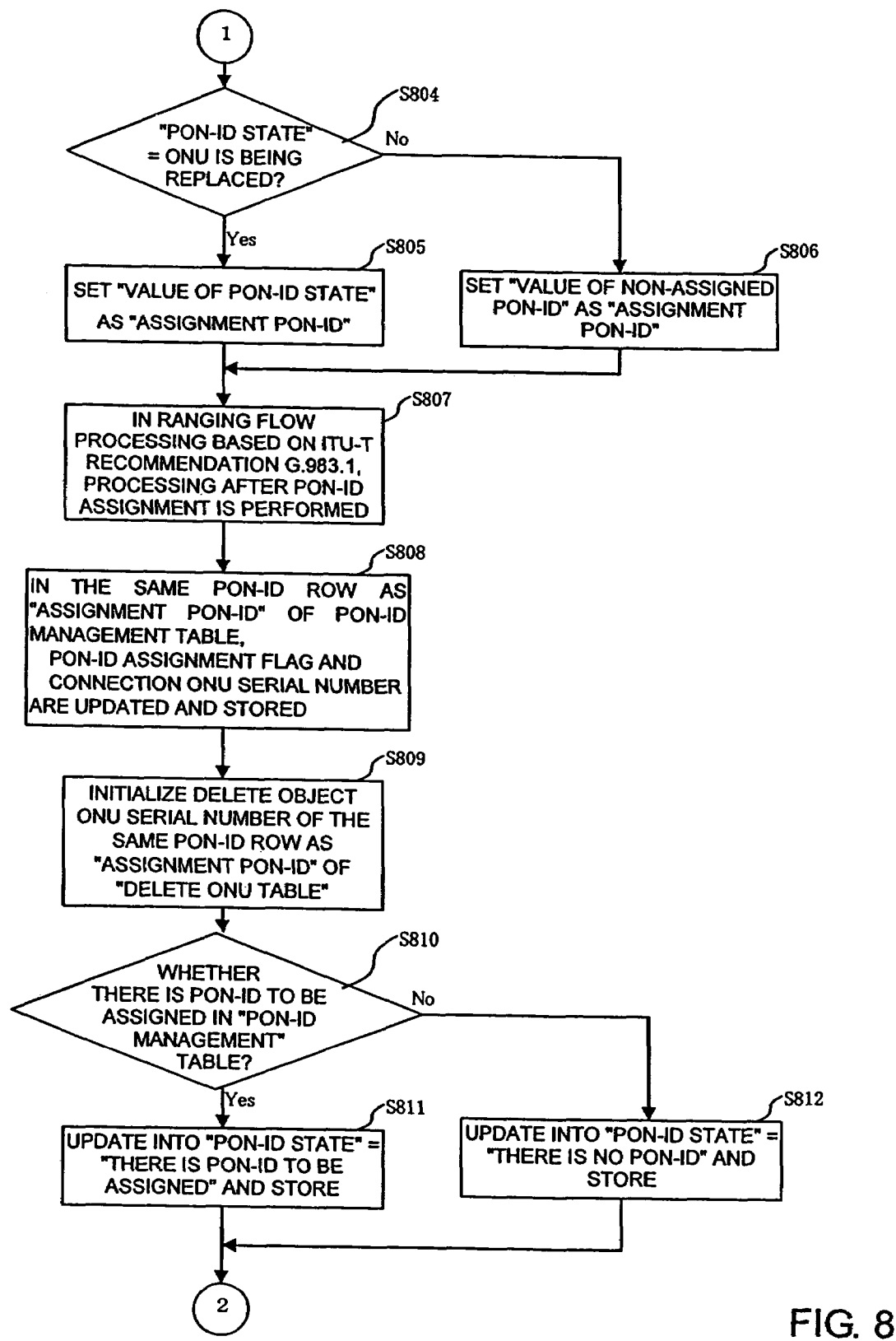
FIG. 8 shows an example of a flowchart of the ONU connection process.
Figure 9:
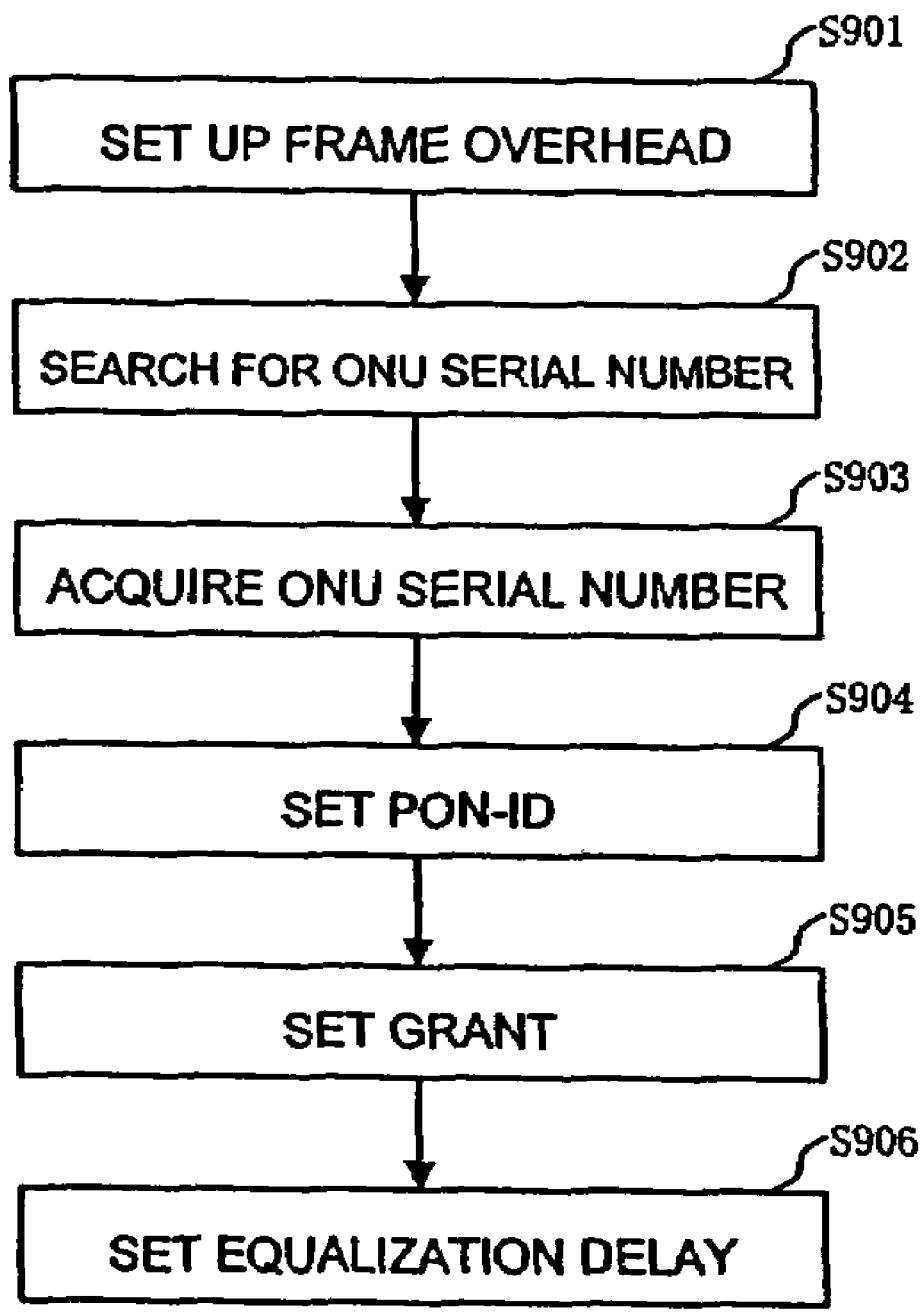
FIG. 9 is a flowchart showing the outline of a ranging flow processing in the ITU-T Recommendation G.983.1.

FIGS. 7 and 8 show flowcharts of an example of the ONU connection process 476. The ONU connection process 476 of step S8 is the process to perform the new connection of the installed ONU. FIG. 9 is a rough flowchart up to the ONU connection in the ranging flow processing described in the ITU-T Recommendation G.983.1. Since the ranging flow is described in the ITU-T Recommendation G.983.1, its explanation will be omitted.

In the ONU connection process 476, a processing up to the ONU serial number acquisition (S903 of FIG. 9) is performed in the ranging flow processing by the Method B based on the ITU-T Recommendation G.983.1 (S801 of FIG. 7). In the ranging flow by the Method B, since the ONU connection is performed without registration of the serial number of the ONU 60 from the OLT 40, the search processing of the ONU serial number is required. In this embodiment, a known technique can be used as the search method of the ONU serial number. Here, when there is a newly connected ONU 60, the serial number thereof is acquired.

Next, it is judged whether the ONU serial number has been acquired (S802 of FIG. 7). In the case where the ONU serial number has not been acquired (No route of S802 of FIG. 7), it means that a new ONU has not been connected during one cycle of the ONU serial number search, and accordingly, the ONU connection process 476 is ended.

In the case where the ONU serial number has been aquired (Yes route of S802 of FIG. 7), it is judged whether or not the acquired ONU serial number exists in the delete ONU table 464 (S803 of FIG. 7). In the case where the acquired ONU serial number exists in the ONU delete table 464 (Yes route of S803 of FIG. 7), since the ONU is the delete object, the ONU connection is not performed, and in order to continue the ONU search processing from the subsequent bit pattern, return is made to the ONU serial number search processing (S801 of FIG. 7). For example, in the case where the ONU itself is still connected although the instruction of "ONU" deletion is received, the serial number search is made by the foregoing ranging flow, however, the connection processing is not preformed for the ONU. In the case where the acquired ONU serial number does not exist in the delete ONU table 464 (No route of S803 of FIG. 7), since the ONU is a newly connected ONU, the PON-ID state 462 is next read, and it is judged whether or not the PON-ID state 462 indicates "ONU is being replaced" (S804 of FIG. 8). For example, as shown in FIG. 5, it is judged whether the PON-ID state is a value of 0 to 63.

In the case where the PON-ID state 462 indicates "ONU is being replaced" (Yes route of S804 of FIG. 8), the value of the PON-ID state 462 is set to be the PON-ID value which is assigned to the ONU whose serial number has now been acquired (S805 of FIG. 8). For example, the PON-ID state 462 indicates a value "3", "3" is set as an "assigned PON-ID value".

In the case where the PON-ID state 462 does not indicate "ONU is being replaced" (No route of S804 of FIG. 8), the PON-ID management table 463 is searched, and one of non-assigned PON-ID values is set as the "assigned PON-ID value" (S806 of FIG. 8). The non-assigned PON-ID is the PON-ID indicating that the PON-ID assignment flag 4631 indicates a value "0". In another method, the connection ONU serial number 4632 of the PON-ID management table 463 is the PON-ID indicating a previously determined value (for example, all are 0 or null code).

Next, the processings (S904 to S906 of FIG. 9) subsequent to the PON-ID setting of the ranging flow processing described in the ITU-T Recommendation G.983.1 are carried out (S807 of FIG. 8). By these processings, the ONU 60 and the OLT 40 are connected.

Next, in the PON-ID management table 463, a value "1", which indicates that assignment has been made, and the acquired ONU serial number are respectively stored in the PON-ID assignment flag 4631 and the connection ONU serial number 4632 at the same PON-ID row as the "assigned PON-ID value", and the PON-ID management table 463 is updated (S808 of FIG. 8).

Next, in the delete ONU table 464, the delete object ONU serial number 4641 at the same PON-ID row as the "assigned PON-ID value" is deleted (initialized) from the table (S809 of FIG. 8). This "S809" processing is a correspondence processing at the time of ONU replacement. In the case where the ONU replacement instruction is received, the ONU serial number as the delete object and before the replacement is stored in the delete object ONU serial number 4641 at the PON-ID row of the delete ONU table 464. When the ONU replacement is performed, the PON-ID is assigned to the new ONU after the replacement, and the ONU serial number of the delete object is deleted from the delete ONU table 464.

Next, the PON-ID management table 463 is searched, and it is judged whether there is room for the PON-ID (whether there is non-assigned PON-ID) (S810 of FIG. 8). For example, reference is made to the PON-ID assignment flag, and when there is "0" indicating the non-assignment, it is judged that there is room. In the case where there is room (Yes route of S810 of FIG. 8), "there is PON-ID to be assigned" and is stored (S812 of FIG. 8). In the case where there is no room (No route of S810 of FIG. 8), the PON-ID state 462 is made to have a value (for example, 255) indicating "there is on PON-ID to be assigned" and is stored (S811 of FIG. 8). This is the end of the ONU connection process.

Figure 10:
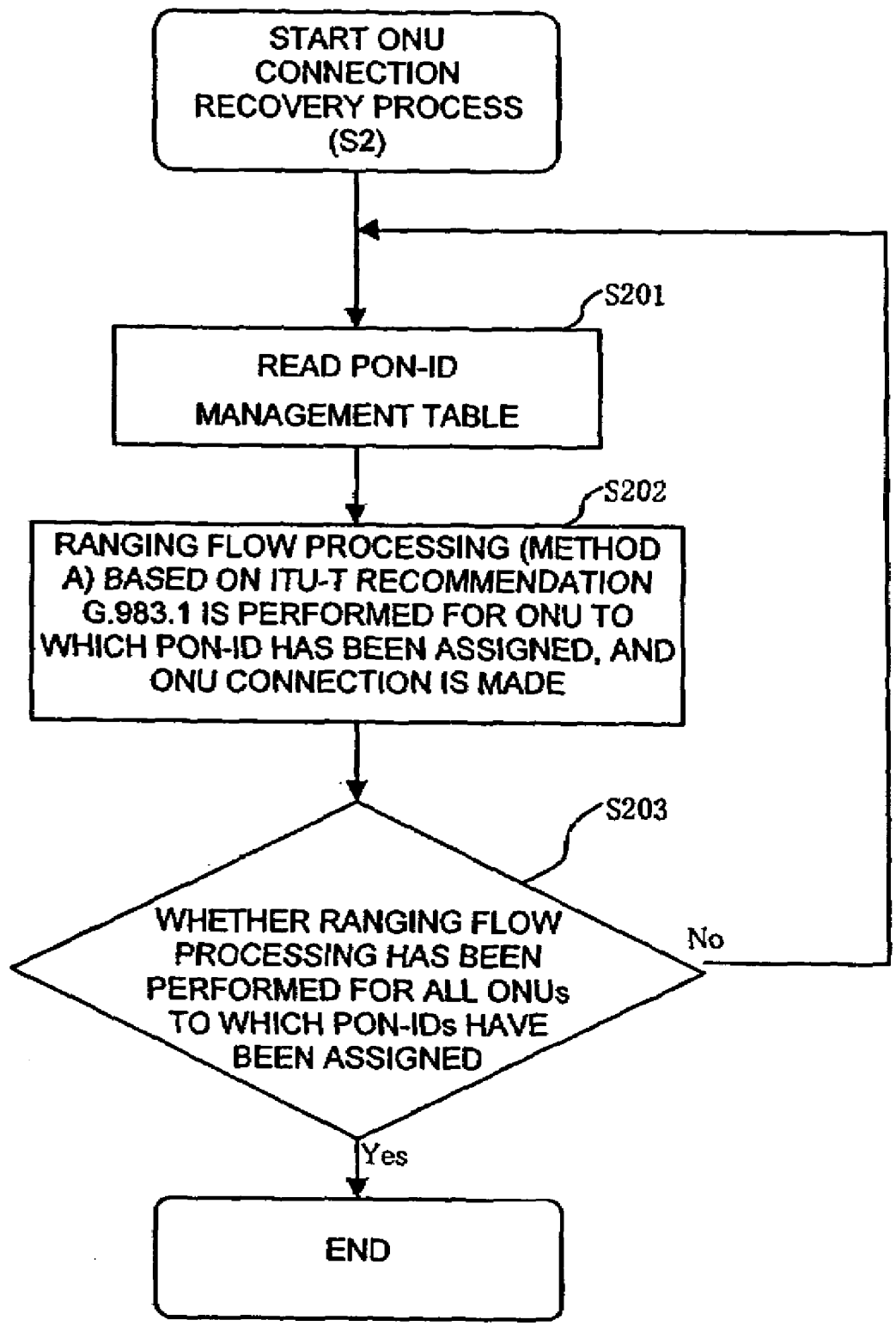
FIG. 10 shows an example of a flowchart of an ONU connection recovery process.

FIG. 10 shows a flowchart of an example of the ONU connection recovery process 473. The ONU connection recovery process 473 of step S2 of FIG. 6 is such a process that the OLT is once started and after the ONU connection is performed, in the case where the OLT is restarted, the connection of the ONU is recovered in accordance with the setting stored in the past.

In the ONU connection recovery process 473, respective pieces of the information of the PON-ID management table 463 are read (S201 of FIG. 10). Next, the ranging flow processing (for example, S901, S903 to S906 of FIG. 9) by the Method A based on the ITU-T Recommendation G.983.1 is performed for the ONU 60 to which the PON-ID has been assigned (S202 of FIG. 10).

Although the ONT connection method in this embodiment is made the Method B, in the ONU connection recovery process 473, since the ONU serial number has already been stored in the PON-ID management table 463, it is possible to perform the ONU connection by the same procedure as the Method A.

Next, it is judged whether or not the ranging flow processing has been performed for all the ONUs 60 to which the PON-IDs have already been assigned (S203 of FIG. 10). When there is an ONU 60 to which the PON-ID has been assigned and whose processing has not been performed (No route of S203 of FIG. 10), return is made to the processing of S201, and the processing is repeated. When the processing has been made for all the ONUs to which the PON-IDs have been assigned (Yes route of S203 of FIG. 10), the ONU connection recovery process 473 is ended.

Figure 11:
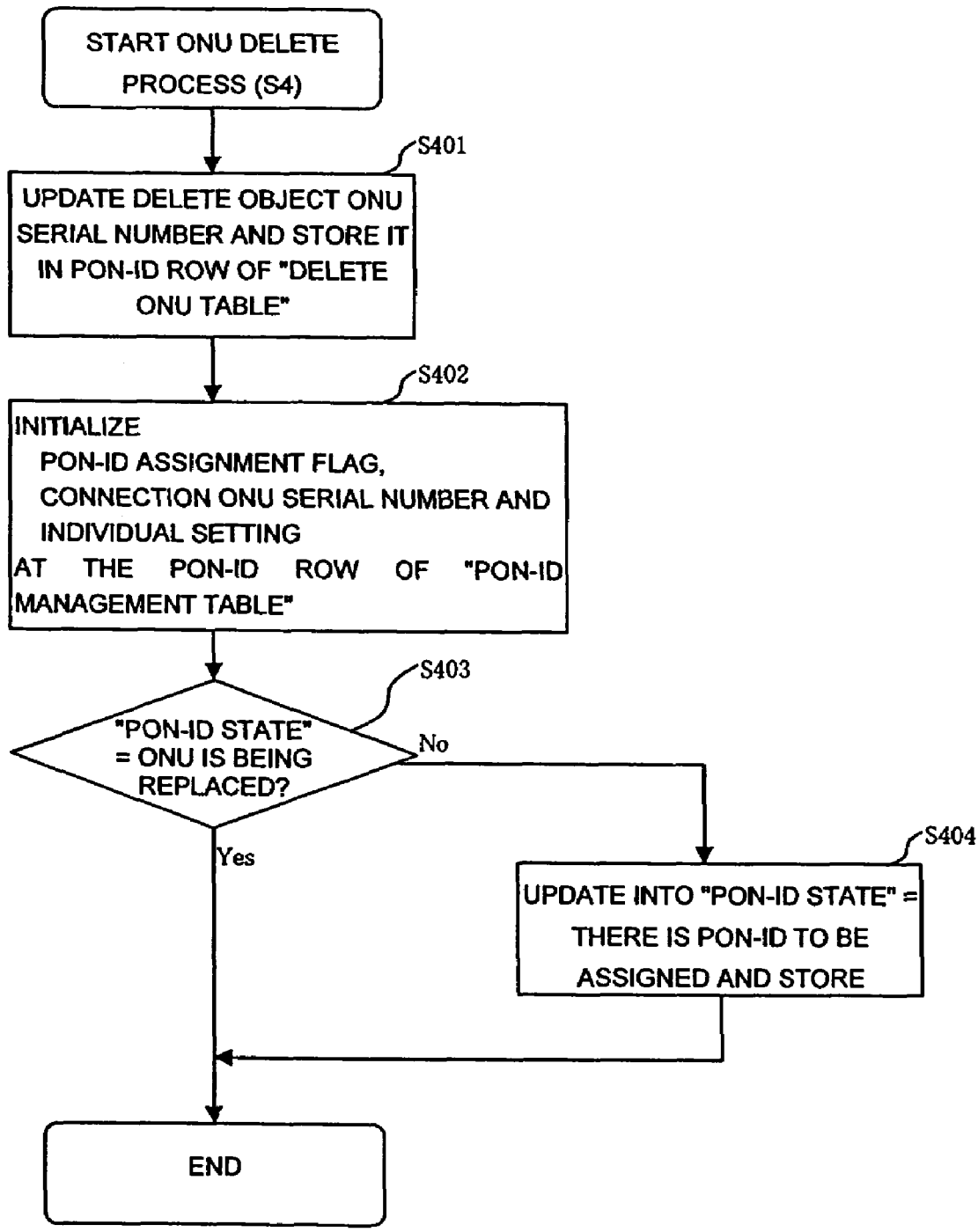
FIG. 11 shows an example of a flowchart of an ONU delete process.

FIG. 11 is a flowchart of an example of the ONU delete process 474. The ONU delete process 474 of step S4 of FIG. 6 is a process to delete the registration of the once connected ONU when the ONU 60 is removed due to, for example, termination of contract.

The ONU delete process 474 receives, from the operation system 10 or the initial setting terminal 80, the ONU delete instruction to specify the ONU to be deleted. At this time, the way of specifying the ONU of the delete object may be such that it is specified by the PON-ID, or it is specified by the ONU serial number, and in the ONU delete process 474, the PON-ID is reversely obtained from the ONU serial number of the PON-ID management table 463.

In the ONU delete process 474, the serial number of the delete object ONU is stored in the PON-ID row of the delete ONU table 464 (S401 of FIG. 11). As the serial number of the delete object ONU, the serial number acquired from the PON-ID management table 463 can be used based on, for example, the PON-ID specified by the ONU delete instruction. Next, in the PON-ID management table 463, the PON-ID assignment flag 4631, the connection ONU serial number 4632, and the individual setting 4633 at the PON-ID row as the delete object are initialized (S402 of FIG. 11).

Next, the PON-ID state 462 is read, and it is judged whether or not the PON-ID state 462 indicates "ONU is being replaced" (S403 of FIG. 11). In the case where the PON-ID state 462 does not indicate "ONU is being replaced" (No route of S403 of FIG. 11), a vacancy (non-assignment) ought to occur in the PON-ID assignment by the ONU deletion, an update is made such that the PON-ID state 462 indicates "there is PON-ID to be assigned" (S404 of FIG. 11), and the ONU delete process 474 is ended.

In the case where the PON-ID state 462 indicates "ONU is being replaced" (Yes route of S403 of FIG. 11), the ONU delete process 474 is ended. The ONU replacement process 475 of step S6 of FIG. 6 is a process to replace the ONU when the ONU goes wrong.

Figure 12:
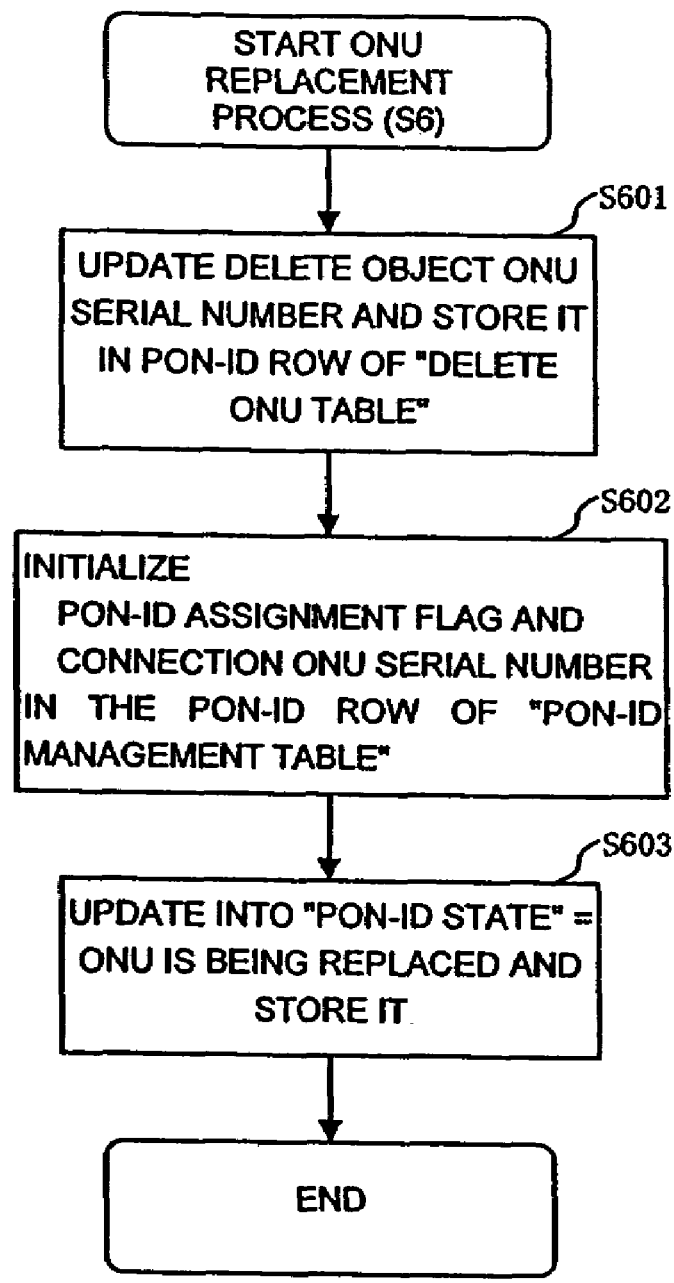
FIG. 12 shows an example of a flowchart of an ONU replacement process.

FIG. 12 shows a flowchart of an example of the ONU replacement process 475.

In the ONU replacement process 475, the ONU replacement instruction to specify the ONU to be replaced is received from the operation system 10 or the initial setting terminal 80. At this time, the way of specifying the ONU of the replacement object may be such that it is specified by the PON-ID, or it is specified by the ONU serial number, and in the ONU replacement process 475, the PON-ID is reversely obtained from the ONU serial number of the PON-ID management table 463.

In the ONU replacement process 475, the serial number of the replacement object ONU is stored in the PON-ID row of the delete ONU table 464 (S601 of FIG. 12). As the serial number of the replacement object ONU, based on the specified PON-ID, a number acquired from the PON-ID management table 463 can be used.

Next, in the PON-ID management table 463, the PON-ID assignment flag 4631 and the connection ONU serial number 4632 at the PON-ID row as the replacement object are initialized and stored (S602 of FIG. 12). At this time, since the ONU is replaced, the individual setting 4633 is not initialized and is held.

Next, the PON-ID state 462 is updated to indicate "ONU is being replaced" and is stored (S603 of FIG. 12), and the ONU replacement process 475 is ended. For example, the value of the specified PON-ID is stored in the PON-ID state 462.

Figure 13:
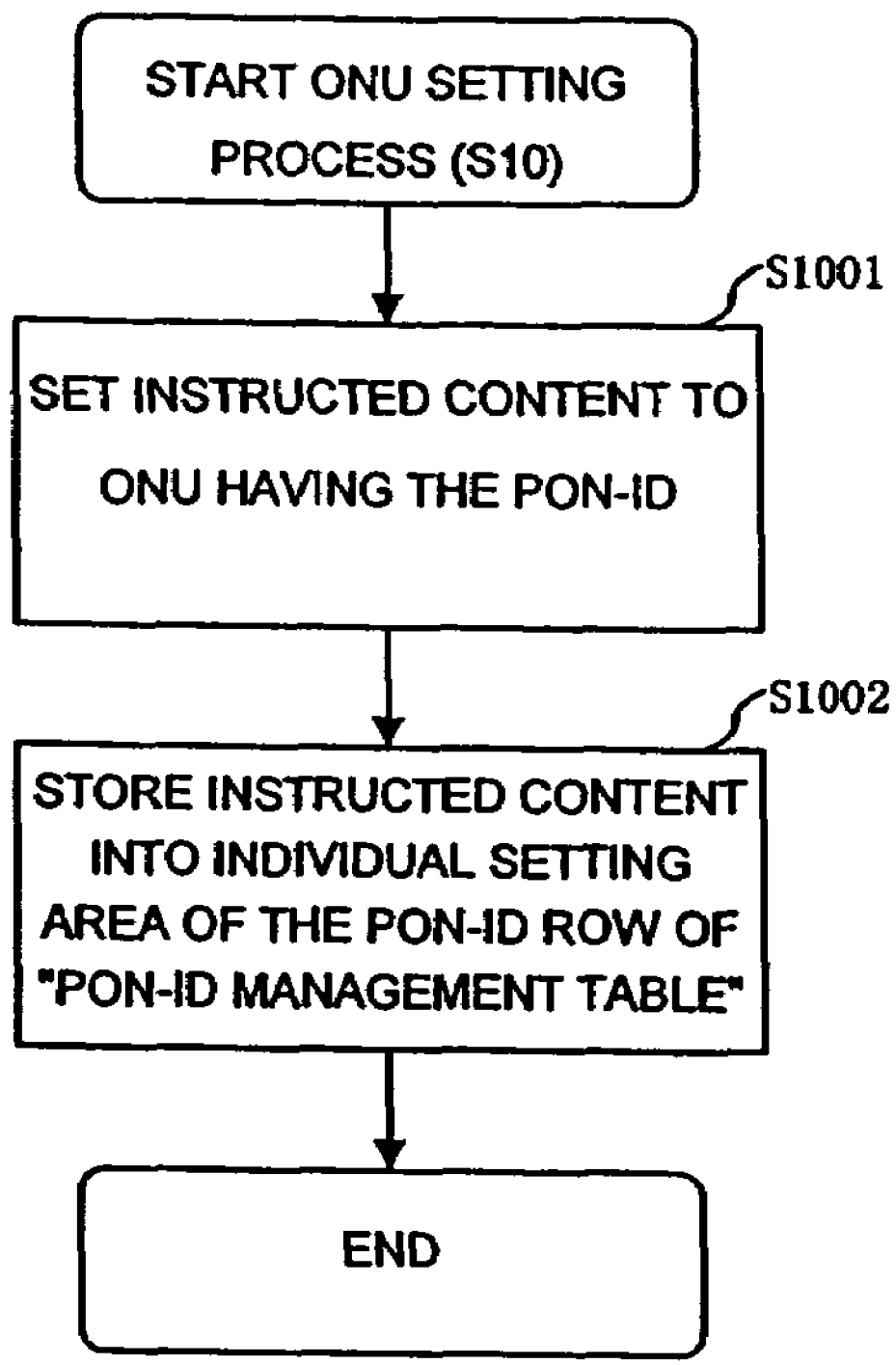
FIG. 13 shows an example of a flowchart of an ONU setting process.

FIG. 13 is a flowchart of an example of the ONU setting process 477. The ONU setting process 477 of step S10 of FIG. 6 is a process to set and store individual data relevant to the ONU.

In the ONU setting process 477, data content to be set in the ONU is received from the operation system 10 or the initial setting terminal 80. The data content includes, for example, a network address, a maximum bandwidth, a user name and the like. At this time, the way of specifying the ONU of the data setting object may be such that it is specified by the PON-ID, or it is specified by the ONU serial number, and the PON-ID is reversely obtained from the ONU serial number of the PON-ID management table 463 in the ONU setting process 477.

In the ONU setting process 477, the data setting is performed for the ONU 60 having the PON-ID in accordance with the instruction from the operation system 10 or the initial setting terminal 80, and the data content (S1001 of FIG. 13).

Next, in the ONU setting process 477, the setting content is stored in the individual setting 4633 at the PON-ID row of the PON-ID management table 463 (S1002 of FIG. 13).

Figure 14:
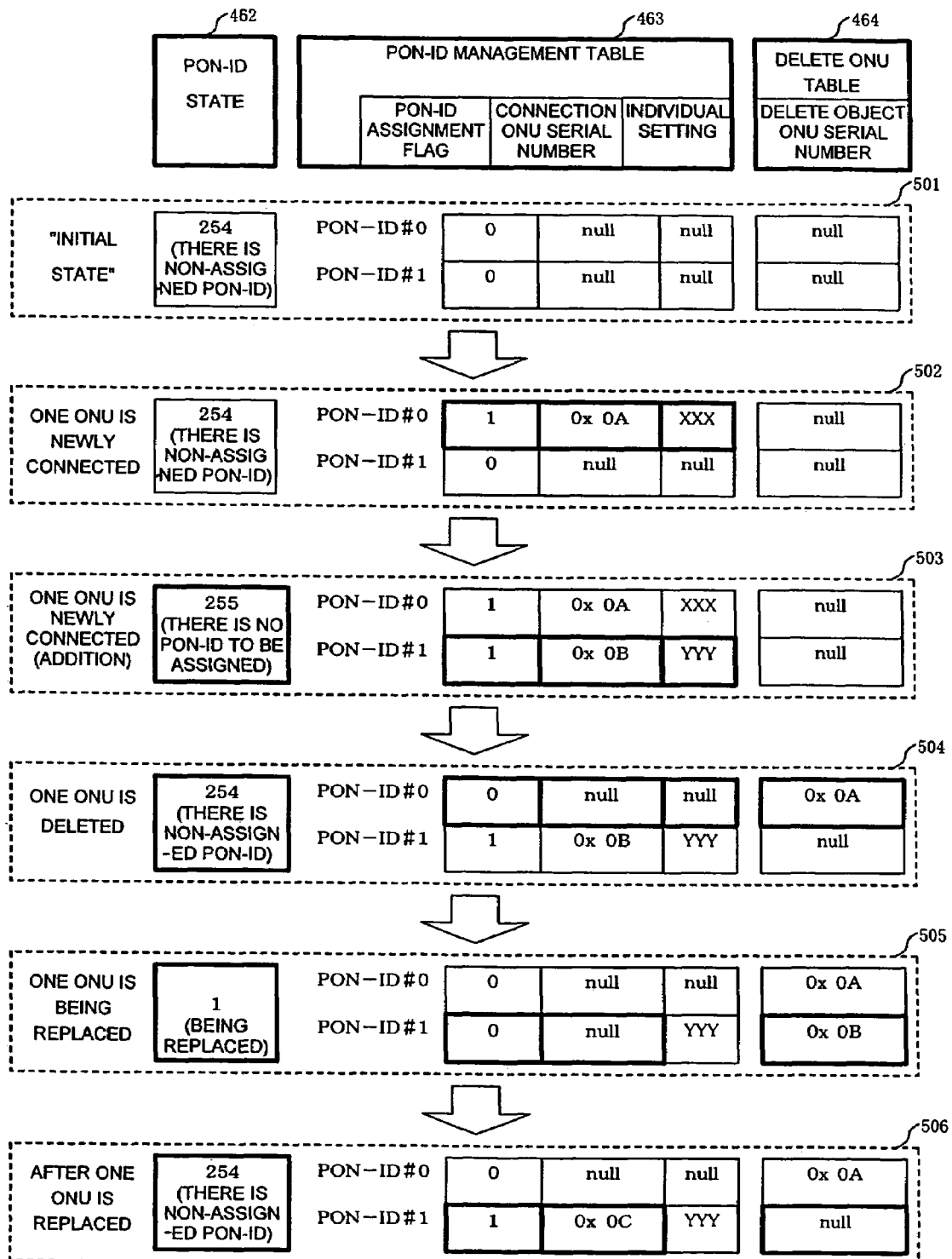
FIG. 14 shows an example of a sequence.

FIG. 14 shows an example of the transition sequence of the PON-ID state 462, the PON-ID management table 463, and the delete ONU table 464 in accordance with the flowcharts of the embodiment. In FIG. 14, for simplification, an explanation will be mad while it is assumed that the maximum connection number of ONUs is two, and the ONU serial number is 1 byte.

A state 501 of FIG. 14 indicates an initial state, the PON-ID state 462 indicates "there is PON-ID to be assigned", and the others indicate initial values. A state 502 of FIG. 14 indicates a state in which one ONU having an ONU serial number 0x0A is connected, the operation is performed in accordance with the ONU connection process of FIGS. 7 and 8, and "XXX" is set as the individual setting in accordance with the ONU setting process of FIG. 13. A state 503 of FIG. 14 indicates a state in which one ONU having an ONU serial number 0x0B is additionally connected, the operation is performed in accordance with the ONU connection process of FIGS. 7 and 8, and "YYY" is set as the individual setting.

A state 504 of FIG. 14 indicates a state in which the delete instruction of the ONU of PON-ID #1 is made, and the operation is performed in accordance with the ONU delete process of FIG. 11. In the ONU delete process, the individual setting (XXX) is also deleted. A state 505 of FIG. 14 indicates a state in which the replacement instruction of the ONU of PON-ID #2 is made, and the operation is performed in accordance with the ONU replacement process of FIG. 12. In the ONU replacement process, the individual setting (YYY) is not deleted.

A state 506 of FIG. 14 indicates the result of an operation in which the ONU having the ONU serial number 0x0B is replaced by a new ONU having an ONU serial number 0x0C, and the operation is performed in accordance with the ONU connection process of FIGS. 7 and 8. Here, there is indicated a state in which the individual setting data "YYY" before the replacement is succeeded to the ONU (serial number 0x0C) after the replacement.

In the embodiment 1, although the ONU management method in the ATM-PON system has been described as an example, the invention can be applied to an ONU management method in a GPON system, or another PON system.

According to the embodiment, in the PON system, it is not necessary that at the time of ONU installation or replacement, an ONU installation worker and an operation system administrator communicate with each other, and the ONU serial number is inputted from the operation system to the OLT, or the ONU setting data is set again after the ONU replacement, and the ONU replacement can be facilitated.

According to the invention, the ONU management method and the optical line termination can be provided in which in the PON system, the ONU connection is performed without registering the serial number from the operation system to the OLT, and the same PON-ID as that before the replacement of the ONU is assigned to the new ONU. Besides, according to the invention, the setting data before the replacement can be succeeded also after the replacement.

According to the invention, in the PON system, it becomes unnecessary that at the time of ONU installation or replacement, the ONU installation worker and the operation system administrator communicate with each other in real time, and the ONU serial number is inputted from the operation system to the OLT. Besides, according to the invention, it is not necessary to set the ONU setting data again after the ONU replacement, and the ONU replacement can be facilitated.

What is claimed is:

1. An optical line termination in a passive optical network system in which each of one or plural first optical network units at user side and the optical line termination at station side are connected to each other through an optical fiber and a splitter, and communication is performed in accordance with an identifier assigned to each of the first optical network units connected to the optical line termination, the optical line termination comprising:

a first storage area in which unique numbers of the first optical network units and individual setting information concerning communication and/or users of the first optical network units are stored correspondingly to the identifier of the first optical network unit;

a second storage area in which the unique number of the first optical network unit which is specified as a replacement object from among the first optical network units is stored correspondingly to the identifier; and a processing unit to perform a processing to replace one of the connected first optical network units by a second optical network unit, wherein the processing unit receives a replacement instruction including the identifier of the first optical network unit specified as the replacement object from an operation system, acquires the unique number of the first optical network unit corresponding to the specified identifier from the first storage area, and stores the acquired unique number of the first optical network unit into the second storage area correspondingly to the specified identifier, deletes the unique number corresponding to the specified identifier from the first storage area, acquires the unique number of the first optical network unit or a unique number of the second optical network unit newly connected instead of the first optical network unit, judges whether the acquired unique number is stored in the second storage area, stores, in a case where the unique number of the second optical network unit is acquired thereby being judged that the acquired unique number is not stored in the second storage area, the acquired unique number into the first storage area correspondingly to the specified identifier; and repeats, in a case where the unique number of the first optical network unit is acquired thereby being judged that the acquired unique number is stored in the second storage area, the acquiring the unique number of the first or the second optical network unit, the judging and the storing into the first storage area.

2. The optical line termination according to claim 1, wherein the processing unit deletes the unique number corresponding to the specified identifier from the second storage area when the unique number is stored in the first storage area.

3. The optical line termination according to claim 1, further comprising:
   a state management unit to be stored information indicating that the optical network unit is being replaced or information indicating presence/absence of the identifier to be assigned,
   wherein the processing unit
   stores information, which indicates that the optical network unit is being replaced in accordance with the replacement instruction, into the state management unit, and stores, after the replacement, the information indicating the presence/absence of the identifier to be assigned, and
   refers to the state management unit when the unique number is acquired, assigns one of non-assigned identifiers in a case where the optical network unit is not being replaced, and stores the acquired unique number and the individual setting information, correspondingly to the identifier into the first storage area.

4. The optical line termination according to claim 1, wherein the processing unit
   receives a delete instruction including the identifier of the first or the second optical network unit specified as a delete object,
   acquires the unique number corresponding to the identifier from the first storage area and stores the unique number into the second storage area correspondingly to the specified identifier, and
   deletes the unique number and the individual setting information, corresponding to the specified identifier from the first storage area.

5. An optical line termination in a passive optical network system in which each of one or plural first optical network units at user side and the optical line termination at station side are connected to each other through an optical fiber and a splitter, and communication is performed in accordance with an identifier assigned to each of the first optical network units connected to the optical line termination, the optical line termination comprising:
   a first storage area in which unique numbers of the first optical network units and individual setting information concerning communication and/or users of the first optical network units are stored correspondingly to the identifier of the first optical network unit;
   a second storage area in which the unique number of the first optical network unit which is specified as a replacement object from among the first optical network units is stored correspondingly to the identifier; and
   a processing unit to perform a processing to replace one of the connected first optical network units by a second optical network unit,
   wherein the processing unit
   receives a replacement instruction including the unique number of the first optical network unit specified as the replacement object from an operation system,
   acquires the identifier of the first optical network unit corresponding to the specified unique number from the first storage area, and stores the specified unique number of the first optical network unit into the second storage area correspondingly to the acquired identifier,
   deletes the specified unique number from the first storage area,
   acquires the unique number of the first optical network unit or a unique number of the second optical network unit newly connected instead of the first optical network unit,
   judges whether the acquired unique number is stored in the second storage,
   stores, in a case where the unique number of the second optical network unit is acquired thereby being judged that the acquired unique number is not stored in the second storage area, the acquired unique number into the first storage area correspondingly to the identifier corresponding to the specified unique number; and
   repeats, in a case where the unique number of the first optical network unit is acquired thereby being judged that the acquired unique number is stored in the second storage area, the acquiring the unique number of the first or the second optical network unit, the judging and the storing into the first storage area.

* * * * *